United States Patent

[11] 3,590,872

| [72] | Inventor | Andrew J. Baity<br>Elmhurst, Ill. |
|---|---|---|
| [21] | Appl. No. | 796,728 |
| [22] | Filed | Feb. 5, 1969 |
| [45] | Patented | July 6, 1971 |
| [73] | Assignee | J. E. Watkins Co.,<br>Maywood, Ill. |

[54] ROTARY VALVE
5 Claims, 5 Drawing Figs.

[52] U.S. Cl. .................................................. 137/625.46,
251/175, 251/301
[51] Int. Cl. ........................................................ F16k 11/02,
F16k 5/14
[50] Field of Search .............................................. 137/625.46,
625.42, 625.15, 625.19; 251/317, 301, 175, 172

[56] References Cited
UNITED STATES PATENTS

| 2,089,943 | 8/1937 | Busby | 137/625.46 X |
| 2,360,389 | 10/1944 | Bergman | 137/625.42 X |
| 2,487,194 | 8/1949 | Snow | 251/301 |
| 2,878,829 | 3/1959 | Folmsbee | 137/625.46 X |
| 2,893,430 | 7/1959 | Holl | 137/625.46 X |
| 2,908,293 | 10/1959 | Johnson | 137/625.46 |
| 3,124,162 | 3/1964 | Cameron | 137/625.46 X |
| 3,460,574 | 8/1969 | Risher | 137/625.46 X |

FOREIGN PATENTS

| 8,617 | 10/1951 | Germany | 251/301 |
| 1,108,026 | 5/1961 | Germany | 137/625.46 |

*Primary Examiner*—M. Cary Nelson
*Assistant Examiner*—Michael O. Sturm
*Attorney*—Wolfe, Hubbard, Leydig, Voit & Osann ABSTRACT: A rotary valve is described in which a disc control member having a confined flow passage is rotatable within a housing to bring the flow passage into alignment with an inlet and an outlet opening on opposite sides of the housing. The outlet opening is sealed against leakage by an elastomeric ring seated in an annular recess surrounding the outlet opening and facing the disc control member. As an alternative, an additional outlet opening is provided away from the axis of the inlet opening, and the disc control member is provided with a passage communicating therebetween.

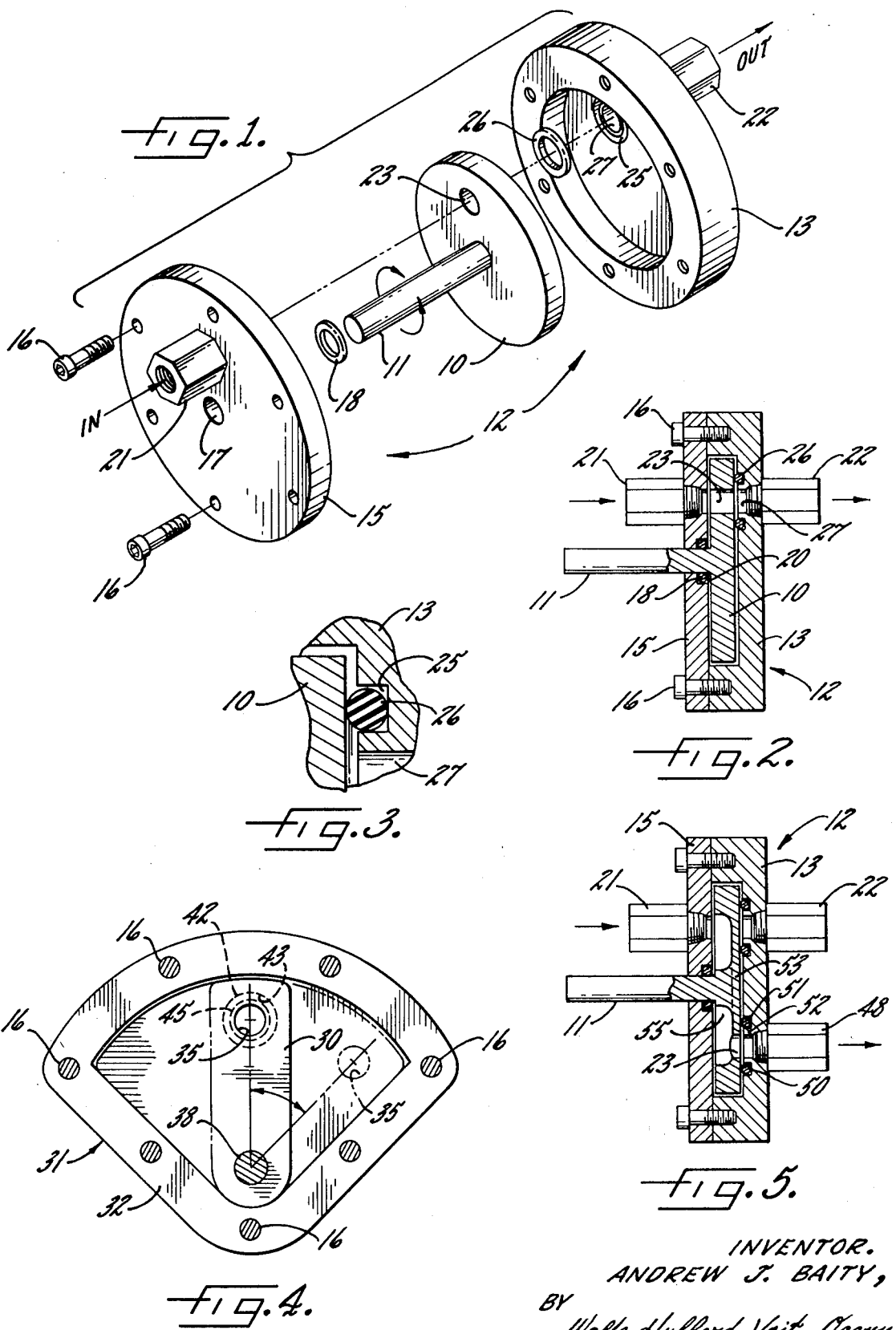

3,590,872

ROTARY VALVE

DESCRIPTION OF THE INVENTION

This invention relates generally to valves and in particular to rotary valves for interrupting the flow of fluid under pressure. In its principal aspect, the invention relates to a control valve for achieving minimum pressure drop in a liquid refrigerant line.

The principal object of the present invention is to provide an improved valve for the control of pressurized fluid such as liquid refrigerant, and which can be manufactured, operated and maintained with a minimum of complication and expense.

Another important object of the invention is to provide such a valve which introduces a minimum amount of pressure drop in the flow of fluid therethrough while maintaining a positive and reliable seal against leakage when in the closed position. It is further intended to provide a valve which is secure against external leakage in all operating conditions. A related object is to provide a valve having the foregoing advantages with the additional provision of an alternate outlet for selective diversion of the fluid flow from the primary outlet.

In regard to the particular application contemplated in the present illustrative embodiment of the invention, it is a detailed object of the invention to provide a refrigerant valve particularly adapted for use in the liquid refrigerant line of a refrigerating system.

Other objects and advantages of the invention will become apparent upon reading the following specification and from reference to the drawings, in which:

FIG. 1 is an exploded view of a first exemplary valve illustrating the invention;

FIG. 2 is a lateral section of the assembled valve of FIG. 1;

FIG. 3 is an enlarged fragmentary detail of the sealing ring shown in FIG. 2;

FIG. 4 is an end elevation in section of an alternate form of the first exemplary valve; and FIG. 5 is a lateral section of a second exemplary valve having two alternate outlets.

While the invention is described in connection with certain illustrative embodiments, it should be understood that these embodiments are illustrative only and do not in any way limit the utility or applicability of the invention in other uses where a valve is required which is simple, reliable and secure against leakage.

Turning to the drawings, there is shown in FIG. 1 a first exemplary embodiment of the present invention in which a control member 10 is formed in the shape of a disc and secured to a shaft 11 for rotation about a longitudinal axis. The control member is contained within a housing 12 which comprises a hollow receptacle plate 13 and a cover plate 15 secured to the receptacle plate 13 by capscrews 16 or any other suitable fasteners.

On one side of the housing 12, in this case the cover plate 15, there is located a shaft opening 17 through which the shaft 11 protrudes for rotation of the control member 10. Leakage through the shaft opening 17 from the interior of the housing 12 is prevented by providing an elastomeric ring 18 such as an O-ring in a suitable annular recess 20 in the cover plate 15 surrounding the shaft 11. In this application the O-ring 18 operates in the usual manner, with internal pressure tending to force it more tightly against the gap between the shaft 11 and its opening 17, thus increasing the effectiveness of the seal.

As a principal feature of the invention, when the valve is in the open position a straight continuous flow passage is provided so that fluid may flow through the valve with a minimum of turbulence and pressure drop. For this purpose an inlet fitting 21 is provided on one side of the housing 12, in this case the cover plate 15, and an outlet fitting 22 is directly aligned with the inlet fitting 21 on the opposite side of the housing 12, in this case the receptacle plate 13. The bores of the inlet and outlet fittings 21, 22 are aligned on a common axis to define a flow passage which is parallel to the rotational axis of the control member 10 about its shaft 11, and radially spaced therefrom. This flow passage is completed when the valve is in the open condition by the provision of a confined flow passage 23 within the control member 10 on the same radius as the bores of the inlet and outlet fittings 21, 22 so that the three openings are precisely aligned when the valve is in the open condition. The hollow within the receptacle plate 13 is desirably a close fit to the control member 10, with only sufficient clearance on each side so that pressure fluid entering the inlet fitting 21 is enabled to fill and surround the control member 10 within the housing 12 for pressure-balancing purposes.

As another feature of the invention, a positive seal against leakage is maintained at the outlet fitting 22 when the valve is closed with relatively low frictional forces which would impede rotation when pressure differentials across the valve 21 are relatively high. This is accomplished through the provision of an annular recess 25 in the inner face of the receptacle plate 13 surrounding the bore leading to the outlet fitting 22 and facing the control member 10. The recess 25 is formed with one side open adjacent the control member 10 in a plane perpendicular to the axis of fluid flow through the outlet fitting 22. Within the recess 25 is placed an elastomeric sealing ring 26 such as an O-ring. As pressure forces on the inlet side of the valve increase, the O-ring 26 is pressed more firmly against the control member 10, with the control member 10 itself being pressed in the direction of the outlet fitting 22 by a pressure equal to the net pressure differential across the valve times the area within the O-ring 26. The valve is thus sealed even more firmly against leakage as the pressure differential increases.

Further in accordance with the invention, the sealing effectiveness of the O-ring 26 within the recess 25 is enhanced by forming the recess 25 shallower than the uncompressed thickness of the O-ring 26 in the direction of fluid flow, that is, perpendicular to the face of the control member 10 against which the O-ring 26 seats. In this way pressure forces within the housing 12 are caused to enter the recess 25 behind the O-ring 26, tending to drive the O-ring 26 into the clearance space between the receptacle plate 13 and the control member 10 when the latter member is rotated to shift the flow passage 23 out of alignment with the inlet and outlet fittings 21, 22. In this way the net pressure force on the control member 10 consists only of the net pressure differential across the valve multiplied by the relatively small area within the O-ring 26. No other pressure forces are present because the clearance between the control member 10 and its housing 12 allows pressure fluid to fill the remainder of the housing and thereby eliminate other pressure forces which would tend to cause the valve to stick or bind during rotation.

A further advantage of the invention is achieved through positioning the recess 25 on the inner face of the housing surrounding the outlet opening 22, thereby defining a ridge or shoulder 27 surrounding the bore leading to the outlet fitting 22. This tends to keep the O-ring 26 in position and prevent it from being torn or pulled out of its recess 25 during rotation of the control member 10.

The foregoing embodiment is useful in such applications as refrigeration systems where a low pressure drop in the liquid refrigerant line is desired, coupled with the requirement for virtually no leakage whatever to the exterior surroundings. The aligned inlet and outlet fittings 22 coupled by the flow passage 23, all being of common diameter and closely spaced, present a net flow resistance very little different from a simple straight pipe. This is greatly superior to conventional globe or ball valves for liquid refrigerant lines which, for use with liquified ammonia, may have a pressure drop equivalent to 28 feet of pipe for a 1-inch-diameter valve, or a pressure drop of 335 feet of pipe for a 12-inch-diameter size. At the low temperatures encountered in liquid refrigerant lines, such as 11° F. for 25 p.s.i.g. liquid ammonia, these losses represent a considerable increase in the horsepower requirement for the compressor of the refrigeration system. At still lower temperatures the costs are even higher since it is well known in this art that the power required to run a compressor increases sharply with decreasing temperatures. A further advantage of this embodiment of the invention is that the circular disc-shaped control member 10 can be rotated either manually or by a motor. Since the valve may be turned 360° in one direction the motor need not be reversible and can simply rotate stepwise in the same direction to open or close the valve.

For those applications where 360° of rotation is not required, a more compact embodiment of the valve of the present invention may be constructed, as shown in FIG. 4. In this alternative embodiment, an arc-shaped control member 30 is used, with a housing 31 having a corresponding hollow receptacle plate 32 and cover plate (not shown) to enable the arcuate control member 30 to be swung from one alternate position to another, thereby bringing a confined flow passage 35 corresponding to the flow passage 23 of the former embodiment into alignment with an inlet (not shown) and an outlet having fittings to the fittings 21, 22 of the former embodiment. A shaft 38 and O-ring and annular recess (not shown) are provided for shaft sealing as in the former embodiment, and the outlet is sealed by means of another O-ring 42 in an annular recess 43 surrounding the outlet opening and defining a shoulder 45 corresponding to the shoulder 27 of the previous embodiment.

In still another alternative embodiment of the present invention, as illustrated in FIG. 5, the principal members of the housing 12 are the same as in the embodiment of FIGS. 1 and 2, except that an alternate outlet fitting 48 is provided rotationally spaced from the first outlet opening 22 at the same radial distance from the axis of control member rotation. The alternative outlet 48 is provided with an annular recess 50, an O-ring 51 and a shoulder 52 similar to the first embodiment. Pursuant to this aspect of the invention, a modified control member 53 is used in which the first flow passage 23 is supplemented by a diversion passage 55 positioned so that when the control member 53 is rotated to the proper position fluid entering the inlet fitting 21 is enabled to travel through the diversion passage 55 to the flow passage 23 and out the alternate outlet opening 48. When it is desired to return the flow through the first outlet fitting 22, the control member 53 is simply rotated to bring the flow passage 23 into alignment with that opening. The valve is shut off as before by rotating the control member 53 to a position wherein the flow passage 23 is not aligned with either of the outlets. Although the provision of the diversion passage 55 detracts somewhat from the advantages of a smooth flow passage between the inlet and outlet fittings 21, 22, the losses are relatively small and represent an advantage over some conventional valves while still providing for an alternative outlet 48 when desired.

The following I claim as invention:

1. A valve comprising in combination,
a housing having an inlet opening in one of the housing walls and a substantially equally sized outlet opening coaxially aligned opposite the inlet opening in another housing wall, said housing forming an annular internal sealing ring recess surrounding the outlet opening and defining an annular shoulder between the recess and the outlet opening,
an elastomeric sealing ring disposed within said recess,
a control member rotatably disposed within said housing having a confined flow passage extending therethrough parallel to the axis of rotation of the control member, said flow passage being sized substantially equally to said inlet and outlet openings and being aligned therewith in an open position of said control member,
said control member having opposed surfaces spaced closely adjacent the corresponding inside surfaces of said housing such that pressure fluid flows straight through the valve with minimum turbulence and fills (a) a space between said control member and said inside surfaces of the housing to partially balance pressure forces on the control member, and (b) the sealing ring recess behind the sealing ring to force the sealing ring into sealing engagement between said shoulder and the adjacent surface of said control member, and
rotating means for rotating said control member to shift the confined flow passage out of alignment with said openings to shut off flow through the valve.

2. A valve according to claim 1 wherein with fluid flow shutoff, pressure fluid admitted through said inlet opening produces a force holding said control member against said sealing ring to block leakage through said outlet opening, the magnitude of said force being a function of the pressure drop across said valve and the effective area of said sealing ring.

3. A valve as defined in claim 2 in which said rotating means includes a shaft and in which said housing includes a shaft opening receiving the shaft and having a surrounding annular recess containing an elastomeric shaft-sealing ring, the surface of said control member adjacent said inlet opening being in sealing engagement with said elastomeric shaft-sealing ring.

4. A valve as defined in claim 3 in which said control member is a disc rotatable through 360° of rotation.

5. A valve comprising in combination,
a housing having an inlet opening in one of the housing walls and alternative outlet openings in another housing wall, one of said outlet openings being coaxially aligned opposite said inlet opening and the alternative outlet opening being angularly spaced from the first outlet opening, said housing forming annular internal sealing ring recesses surrounding each of said outlet openings and defining an annular shoulder between the recess and the respective outlet opening,
elastomeric sealing rings disposed within said recesses,
a control member rotatably disposed within said housing having opposed surfaces spaced closely adjacent the corresponding inside surfaces of said housing such that pressure fluid flowing through the valve fills (a) a space between said control member and said inside surfaces of the housing to partially balance pressure forces on the control member, and (b) the sealing ring recesses behind the sealing rings to force the sealing rings into sealing engagement between said shoulders and the respective adjacent surfaces of the control member, said control member having a confined flow passage extending therethrough parallel to the axis of rotation of the control member permitting flow through either of said outlet openings when said control member is rotated to align said confined flow passage therewith, one of said outlet openings being aligned with said inlet opening for straight through connection by said confined flow passage allowing straight through flow of fluid through the valve, said control member further having a laterally extending diversion passage in communication with said confined flow passage for connection of said inlet opening and said alternate outlet opening for an alternate flow path through the valve, the inactive outlet opening being sealed by the sealing engagement of the associated sealing ring and the adjacent surface of said control member, and
rotating means for rotating said control member to (a) allow flow through either of said outlet openings, or (b) shift the confined flow passage out of alignment with either of said outlet openings to shut off flow through the valve.